United States Patent

[11] 3,621,168

| [72] | Inventor | John E. Durand<br>Costa Mesa, Calif. |
|---|---|---|
| [21] | Appl. No. | 33,318 |
| [22] | Filed | Apr. 30, 1970 |
| [45] | Patented | Nov. 16, 1971 |
| [73] | Assignee | International Telephone and Telegraph Corporation<br>New York, N.Y. |

[54] SWITCHING DEVICE
2 Claims, 12 Drawing Figs.

[52] U.S. Cl. .................................................. 200/84 B
[51] Int. Cl. .............................................. H01h 35/18
[50] Field of Search .......................................... 200/84, 84
B, 67 D; 174/101.5, 65 G; 73/322

[56] References Cited

UNITED STATES PATENTS

| 2,580,759 | 1/1952 | Gille | 200/84 B UX |
| 2,917,932 | 12/1959 | Kline | 200/67 D UX |
| 3,192,337 | 6/1965 | Doty et al. | 200/84 B UX |
| 3,237,221 | 3/1966 | Thomson | 174/101.5 UX |
| 3,309,687 | 3/1967 | Phipps | 200/84 B UX |

FOREIGN PATENTS

| 162,122 | 2/1958 | Sweden | 174/65 G UX |
| 186,346 | 10/1955 | Austria | 200/84 B UX |
| 221,019 | 7/1957 | Australia | 200/84 B UX |
| 257,444 | 10/1964 | Australia | 200/84 B UX |

OTHER REFERENCES

Frank, Ger. Publ. No. 1,042,074, publ. 10- 68 1 sh. and dwg., 2 pg. Spec.

*Primary Examiner*—David Smith, Jr.
*Attorneys*—C. Cornell Remsen, Jr., Walter J. Baum, Paul W. Hemminger, Charles L. Johnson, Jr. and Thomas E. Kristofferson

ABSTRACT: A float switch suspended by its own electrical leads. The leads act as a cantilever beam and avoid the troublesome hinges of the prior art. A mercury switch is also encapsulated in a watertight foam plastic that has gas-filled cells. Thus, the plastic acts as a float, a mounting, and a watertight enclosure for the switch.

INVENTOR.
JOHN E. DURAND
BY
ATTORNEY

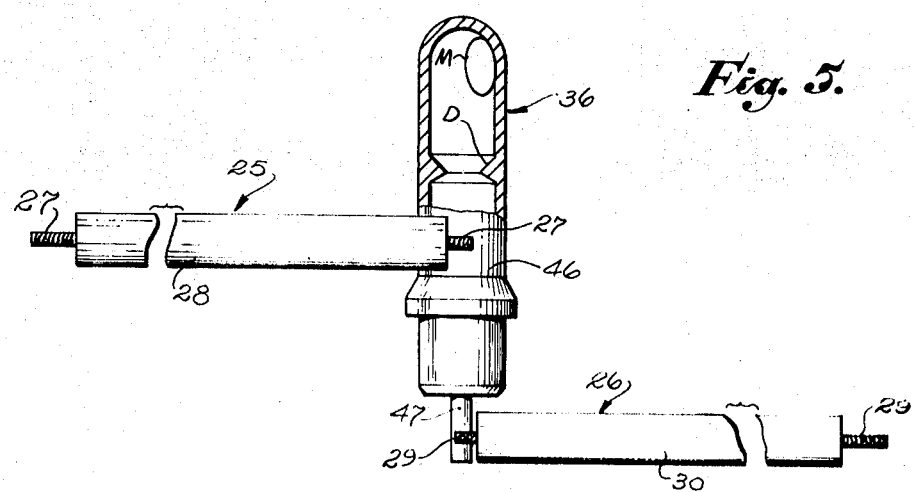
Fig. 5.
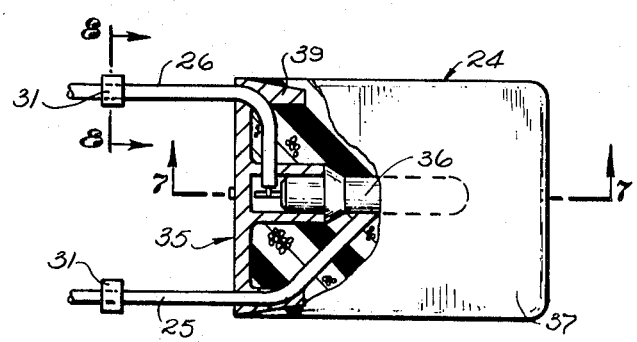
Fig. 6.
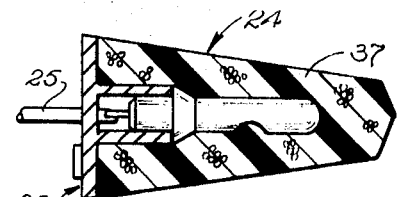
Fig. 7.
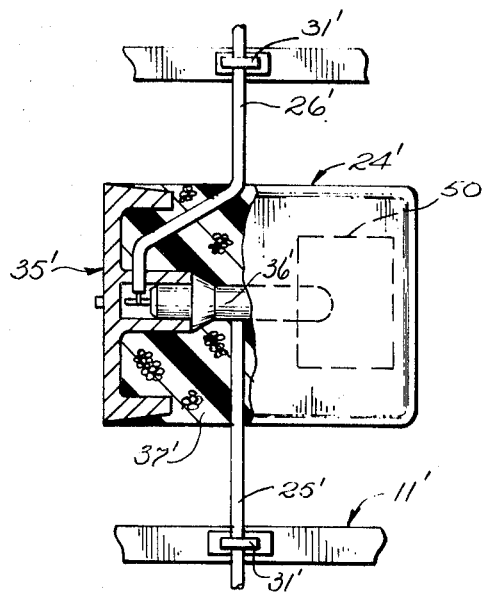
Fig. 9.
Fig. 8.
INVENTOR.
JOHN E. DURAND
BY
ATTORNEY INVENTOR.
JOHN E. DURAND.
BY
*A. Harold Stagg*
ATTORNEY.

SWITCHING DEVICE

BACKGROUND OF THE INVENTION

This invention relates to liquid level detection devices and, more particularly, to a float switch.

In the past, float switches have included a mercury switch supported by a float. The float has been hinged to a fixed structure by a stiff member.

In many applications, it is necessary for such a float switch to operate in a debris-filled liquid such as in water containing debris in the bilge of a ship. In time, such a switch in this type of environment becomes partially or totally inoperative because the debris jams the said hinge and prevents the member from rotating about the hinge. The mercury switch will not operate if the member does not rotate.

The prior art switch has also been large and costly to manufacture and to assemble as well as frequently inoperative.

Also, prior art switches have been encapsulated in floats consisting of several parts. However, the use of more than one part, the assembly thereof, and watertight sealing have caused difficulty. These constructions, thus, have been large in size and costly to manufacture and assemble.

SUMMARY OF THE INVENTION

In accordance with the device of the present invention, the above-described and other disadvantages of the prior art are overcome by providing a flexible member without a hinge for connection between the float and a fixed structure.

It is one outstanding feature of the invention that the selfsame electrical leads to a mercury or other switch are employed as the said flexible member.

It is another outstanding feature of the invention that a switch is molded in a fixed position inside a foam plastic. The plastic can thus act as the float, as a mounting for the switch, and as a watertight seal for the switch.

From the foregoing, it will be appreciated that the use of the switch leads as the flexible member makes the device of the invention small in size, trouble free, and inexpensive. It is trouble free because no hinge is employed. It is small and inexpensive because the leads serve a dual purpose. They act as a mechanical support and as electrical connections.

The foam plastic makes the device small and inexpensive because the plastic serves a triple purpose. It acts as a float, as a switch mounting, and as a watertight seal.

The above-described and other advantages of the invention will be better understood from the following description when considered in connection with the accompanying drawings.

BRIEF DESCRIPTION OF THE DRAWINGS

In the drawings, which are to be regarded as merely illustrative:

FIG. 5 is an enlarged bottom plan view of a mercury switch and two electrical leads thereto;

FIG. 6 is a broken-away top plan view of the float;

FIG. 7 is a longitudinal sectional view of the float taken on the line 7—7 shown in FIG. 6;

FIG. 8 is a transverse sectional view through a clip ring for an electrical lead taken on the line 8—8 shown in FIG. 6;

FIG. 9 is a broken away sectional view of an alternative embodiment of the invention.

DESCRIPTION OF THE PREFERRED EMBODIMENTS

Figure 1:
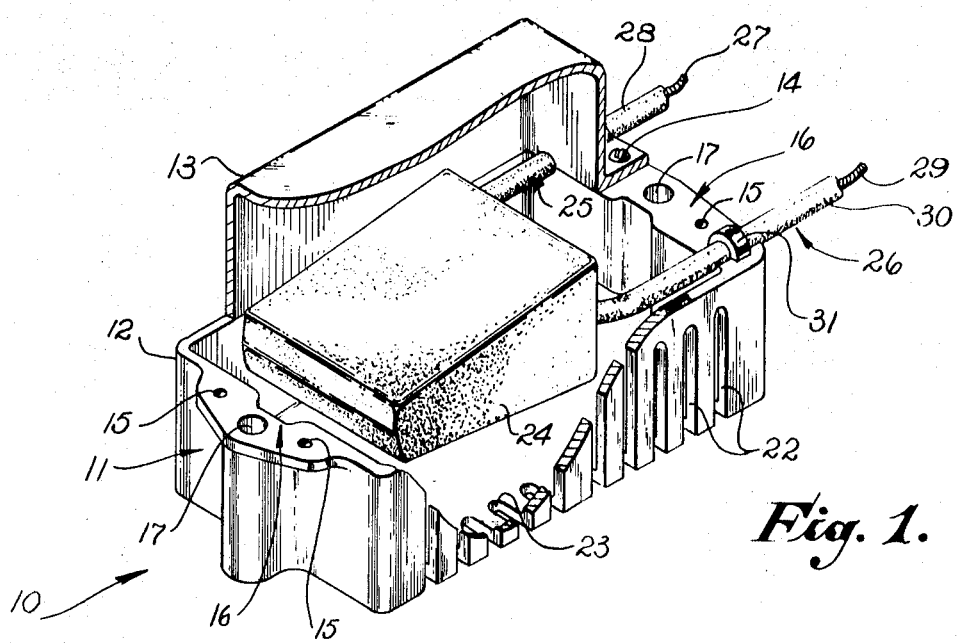
FIG. 1 is a broken-away perspective view of the float switch of the present invention.
Figure 2:
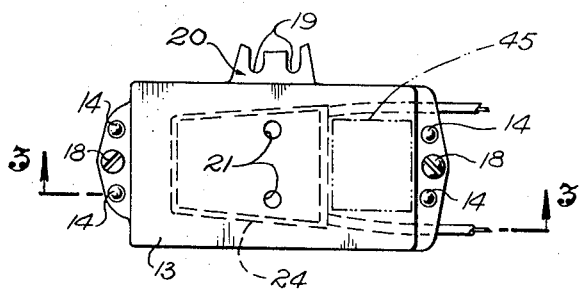
FIG. 2 is a top plan view thereof.
Figure 3:
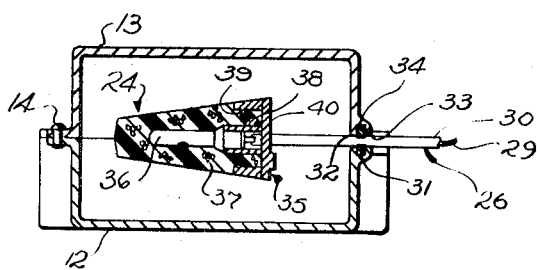
FIG. 3 is a longitudinal sectional view of the float switch taken on the line 3—3 shown in FIG. 2.

In the drawings, in FIG. 1, the flat switch is indicated at 10, including a housing 11 having a lower half 12 and an upper half 15 which are fixed together by rivets 14, as shown in FIG. 2 and 3, which extend through holes 15 in mating flanges 16, as shown in FIG. 1. That is, both members 12 and 13 each have a pair of flanges 16. Flanges 16 also have mounting holes 17 through which mounting bolts 18 shown in FIG. 2 may project. The mounting bolts may be fixed to a mounting plate. Alternatively, two different screws are supplied to allow mounting by flange 20 to a special receptacle in the pump body. In each case, the mounting plate may be fixed inside the bilge of a ship. Switch 10 may then operate a bilge pump.

Member 13 may have vent holes 21 therethrough as shown in FIG. 2. Both members 12 and 13 may be perfectly symmetrical about a plane through the axes of holes 17 shown in FIG. 1, except for flange 20. Member 12 has side wall slots 22 which extend around the corner into bottom wall slots 23.

A float 24 is suspended from housing 11 having electrical leads 25 and 26. Lead 25 has an electrical conductor at 27 and insulation at 26. Lead 26 has an electrical conductor at 29 and insulation at 30. Both leads 25 and 26 may be mounted through housing 11 between members 12 and 13 in an identical manner.

An annular or clip ring 31 is disposed about each lead 25 and 26. Each ring 31 is clamped tightly against each corresponding lead 25 and 26 to a position, for example, as shown in FIG. 8. This is to keep rings 31 from sliding along the lengths of leads 25 and 26.

Since both leads 25 and 26 are held in an identical manner, only the manner in which lead 26 is held will be described. When members 12 and 13 are mated with rivets 14 holding them together as shown in FIG. 3, members 12 and 13 form cylindrical holes 32 and 33 through which lead 26 projects. Thus there is a snug fit of lead 26 between members 12 and 13. Members 12 and 13, when placed together in the position shown in FIG. 3 form a cylindrical cavity to fit closely around ring 31. Ring 31 is, thus, trapped in cavity 34 and prevents movement of lead 26 along its axis as shown in FIG. 3.

As shown in FIG. 3, float 24 includes a plastic retainer 35 and a mercury switch 36 fixed thereto. Polyurethane foam 37 holds the mercury switch in the retainer. Retainer 35 has a cylindrical extension 38 which extends around the base of mercury switch 36. The ends of leads 25 and 26 are fixed relative to float 24. The conductors 27 and 29 are electrically connected to the mercury switch 36. Retainer 35 has four prongs 39, one on each corner to give the float 24 mechanical strength.

Figure 4:
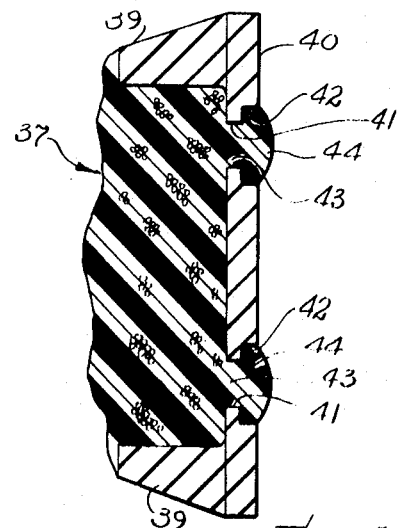
FIG. 4 is an enlarged sectional view of the float.

As shown in FIGS. 3 and 4, retainer 35 has backplate 40 with cylindrical holes 41 therethrough. Backplate 40 also has counterbores at 42. Plastic 37 is held in place in that portions of it at 43 and 44 are respectively foamed in place in holes 41 and in counterbores 42.

From the foregoing, it will be appreciated that housing 11, leads 25 and 26, and float 24 form the rectangular frame of a cantilever beam support for float as indicated by the dotted rectangle 45 in FIG. 2.

As shown in FIG. 5, mercury switch 36 has contacts 46 and 47 to which conductors 27 and 29 are soldered or welded. Switch 36 has a dam D for a mercury pool M. Dam D provides for snap action because pool M flows rapidly over dam D once flow begins. Dam D also provides a differential.

An enlarged view of float 24 with leads 25 and 26 and rings 31 is shown in FIGS. 6 and 7.

Conductors 27 and 29 may be solid, braided, or otherwise. In any event, note will be taken that they have some resilience and some flexibility as a cantilever beam. The leads 25 and 26, thus, perform a dual function. In the first place, they make electrical connections with mercury switch 36. In addition, they provide nearly friction-free, hingelike support for float 24. Moreover, the "hinge" has no sliding surfaces. This is an outstanding advantage of the invention. For example, in a bilge, float switch hinges often become clogged with debris and then become inoperative. The "hinge" of the present invention has no sliding surfaces and therefore cannot become clogged with debris.

An alternative embodiment of the invention is shown in FIG. 9. The embodiment shown in FIG. 9 includes a housing 11', and a float 24' suspended therein by electrical leads 25' and 26'. As before, leads 25' and 26' have clip rings 31'. The embodiment shown in FIG. 9 may be identical to that shown in FIG. 1 with the following exceptions. Leads 25' and 26' have a common horizontal axis. Leads 25' and 26', therefore, emanate from the sides of float 24' and are retained in the sides of housing 11'. Float 24' has a retainer 35'. A counter balance slug 50 is molded inside a foam plastic 37'. Slug 50 may be substantially rectangular in any section except for a recess to accommodate one end of mercury switch 36'.

In the embodiment of FIG. 9, float 24' rocks about the axis of lead 25' and 26', the latter acting as a torsion hinge. For proper balance, by a judicious selection of materials, slug 50 may be eliminated. The same is true of retainer 35' in all of the embodiments described herein. The location of the hinge axis of float 24' may be employed to solve the balance problem in addition.

Figure 10:
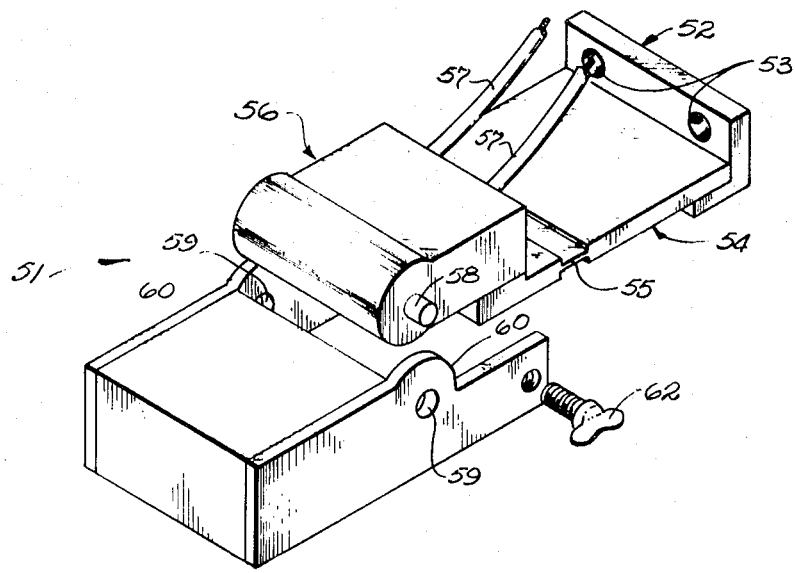
FIGS. 10, 11, and 12 are perspective views of still other alternative embodiments of the invention.

A further embodiment of the invention is indicated at 51 in FIG. 10 including a bracket 52 having holes 53 therethrough so that bracket 53 may be bolted to the wall or another bracket of a bilge wall. A beam 54 is fixed to bracket 52. Beam 54 has a narrow section 55 which acts as a cantilever beam. A mercury switch 56 is fixed to beam 54. Mercury switch 56 has output lead 57. Mercury switch 56 also has stub shafts 58 on opposite sides thereof to fit in holes 59 through arms 60 on a float 61. The position of float 61 may be adjusted relative to mercury switch 56 by rotating float 61 about the axis of stub shafts 58 and then tightening a setscrew 62.

Figure 11:
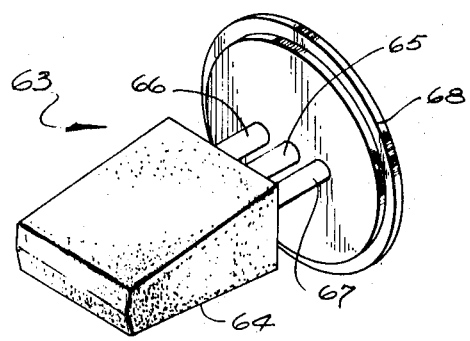

Still another embodiment of the invention is indicated at 63 in FIG. 11. A float 64 identical to float 24 except for an additional electrical lead 65 is supported by leads 65 and 66 and 67. The mercury switch carried by float 64 is a single pole, double throw switch. Leads 65, 66, and 67 are fixed in position relative to a mounting plate 68 through holes therein. Float 64 may thus be supported inside a tank, support 68 being provided with a fluidtight seal to the tank around an opening therethrough through which float 64 and leads 65, 66, and 67 may project.

The embodiment of FIG. 11 may easily be modified to a single pole, single throw switch with only two leads.

Figure 12:
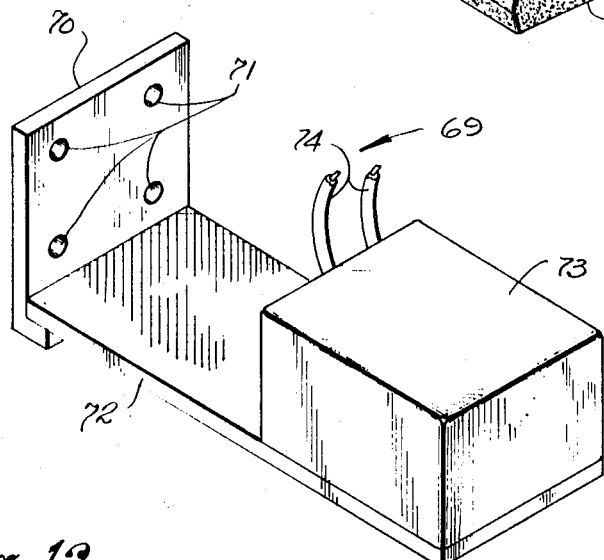

A further embodiment of the invention is indicated at 69 in FIG. 12. A bracket 70 has holes 71 therethrough for mounting. A braided strip 72 is fixed at one end to bracket 70 and its other end to a float 73. Float 73 carries a mercury switch. Strip 72 does not act as an electrical conductor, two electrical conductors 74 being provided from float 73.

From the foregoing, it will be appreciated that the float switch 10 has substantial advantages. Leads 25 and 26 perform the dual function of supporting the switch and supplying electrical connections thereto.

It is also an advantage of the invention that mercury switch 36 is molded inside plastic 37. Thus, the plastic 37 acts as a float and as a mounting for switch 36. Moreover, plastic 37 acts as a fluidtight seal for switch 36.

Also, it is an advantage of the invention that the use of leads 25 and 26 as float supports makes the invention small in size. The invention is also trouble free because sliding hinges are not used. The small size and simple character of the invention also makes it inexpensive.

The dual functions of many of the parts makes it possible to make a small and inexpensive switch. If a part performs a dual function, the omission of another part is possible. The omission thus decreases size and expense.

Note will be taken that the invention has a number of features. Thus, in accordance with the invention, any one feature may be employed by itself or in combination with any one or more or all of the features without departing from the invention.

What is claimed is:

1. A switching device comprising: a bendable, leaf spring cantilever beam having one end adapted to be held in a fixed position, the other end of said beam being adapted to move freely as said beam is flexed; a float fixed to said beam at a position along the length thereof spaced from said one end in a direction toward said other end; and a switch fixed to said beam at a position along the length thereof spaced from said one end in a direction toward said other end, said switch being actuated when it is tilted said switch being supported in a fixed position relative to said float inside thereof, said float including a retainer comprising a plastic body including a rectangular plate having a prong extending perpendicularly from one side thereof at each corner thereof, said plate and said prongs being integral with one another, said plate having one bore therethrough and a counterbore on the other side thereof, said float including a foam plastic molded tightly around said switch on said one plate side, between said prongs and through said bore filling said counterbore, said counterbore having an end surface at said bore to lock said plastic in place, said leads including metal conductors surrounded by electrical insulation, the conductor and insulation of each lead being fixed relative to said switch at one point along its length, said one points being adjacent, a housing having means on the exterior thereof for mounting in a fixed position, said housing including clamp means to hold said leads in fixed positions at two adjacent other points along their lengths spaced from said one points, said housing being hollow and being located around said float and portions of said leads in spaced relation thereto, said housing having slots through the bottom thereof extending upwardly through the sides thereof, and at least one vent hole through the top thereof, said switch including an elongated, hollow metal envelope having a uniform cross section throughout its length except for a vertical ridge at the bottom thereof between the ends thereof, said ridge acting as a dam for said mercury to provide for rapid switch actuation, said clamp means including a ring fixed around each lead, each ring being fixed tightly to each corresponding lead so that the rings will not slide along the lengths of the leads, said housing having a cavity for each ring and lead, said cavities both having openings on each side thereof for said leads to pass through said housing, said openings being smaller than said rings to keep said rings trapped inside said cavities, said leads thereby being prevented from moving any substantial additional distance into or out of said housing.

2. A switching device comprising: a flexible member; a float fixed to said member; a switch fixed relative to said float, said switch being actuated when it is tilted; and a housing having holes through the top and bottom thereof surrounding said float, said member including two electrical leads electrically connected to said switch, said housing including clamp means to hold said leads in fixed positions relative to said housing, said clamp means including a ring fixed around each lead, each ring being fixed tightly to each corresponding lead so that the rings will not slide along the lengths of the leads, said housing having a cavity for each ring and lead, said cavities both having openings on each side thereof for said leads to pass through said housing, said openings being smaller than said rings to keep said rings trapped inside said cavities, said leads thereby being prevented from moving any substantial additional distance into or out of said housing, said leads acting as cantilever beams and being of a uniform diameter from their connection with said ring to the connection with said float.

* * * * *